Jan. 7, 1947.  L. R. BICKFORD, JR  2,413,940
FLUORESCENT LIGHT SOURCE
Original Filed Jan. 11, 1944

LAWRENCE R. BICKFORD JR.
INVENTOR

BY John J. Rogan
ATTORNEY

Patented Jan. 7, 1947

2,413,940

UNITED STATES PATENT OFFICE 2,413,940

FLUORESCENT LIGHT SOURCE

Lawrence R. Bickford, Jr., State College, Pa., assignor to Sylvania Electric Products Inc., Emporium, Pa., a corporation of Massachusetts Original application January 11, 1944, Serial No. 517,806. Divided and this application March 16, 1944, Serial No. 526,768

7 Claims. (Cl. 176—122)

This invention relates ao fluorescent glasses and more particularly to glasses which emit long wave ultraviolet radiation in response to excitation by short wave ultraviolet radiation.

In some cases, it is desirable to obtain only the long wave ultraviolet radiation from a light source which itself emits both, long and short wave ultraviolet, as, for example, a mercury arc lamp. The conventional expedient for attaining this result is to use a filter glass which absorbs the short wave ultraviolet, while passing the long wave ultraviolet radiation. This may be accomplished by making the envelope of the arc lamp of Corning ultraviolet transmission glass #504 or #589 or by interposing a blue corex glass filter·Corning filter glass #986 between a quartz mercury lamp and the object to be exposed to the long wave ultraviolet radiation.

This procedure has the disadvantage that the short wave ultraviolet energy produced by the light source is wasted, and is converted into heat which may be undesirable.

This wasting of short wave ultraviolet energy has so far been unavoidable in the conversion of ultraviolet radiation into visible light by fluorescent and phosphorescent materials which emit visible light in response to long wave ultraviolet radiation only, but have no excitation band in the short wave ultraviolet region which is present in most ultraviolet light sources.

It is, therefore, a principal object of the invention to produce fluorescent light sources which emit long wave ultraviolet radiation viz., 3000 to 4000 Å. in response to excitation by short wave ultraviolet radiation, e. g., 2537 Å.

It is another object of the invention to produce a fluorescent lamp incorporating a cerium-activated phosphate glass.

It is a still further object of the invention to produce fluorescent light sources embodying a filter glass which passes long wave ultraviolet and visible radiation, and absorbs short wave ultraviolet without transforming it into heat.

According to another object of the invention, means are provided for increasing the luminous efficiency of fluorescent lamps and the like.

Another principal object of the invention relates to an envelope for a gas or vapor discharge lamp which consists of two layers of fluorescent glass, the inner layer being made of cerium-activated phosphate glass; the outer of a material emitting visible light primarily in response to long wave ultraviolet radiation.

An additional object of the invention is to provide a fluorescent lamp with a cerium-activated phosphate glass comprising one or several of the phosphates of elements of the first, second and third groups of the periodic system.

According to a feature of the invention, means are provided including a cerium-activated phosphate glass, to produce visible fluorescence from a source of short wave ultraviolet radiation by multiple frequency conversion.

A further feature of the invention relates to a fluorescent lamp embodying a metal phosphate glass having the optimum content of trivalent cerium for producing improved conversion of short wave ultraviolet into long wave ultraviolet radiation.

Another feature of the invention relates to a fluorescent lamp having a cerium-activated phosphate glass consisting of the phosphates of Al, Zn, and Ba in certain preferred proportions.

In the drawing which represents certain preferred embodiments,

The cerium-activated phosphate glasses according to the invention may be made up from different types of raw materials. According to one method, the raw batch comprises $P_2O_5$ and compounds in the form of salts of elements of the first, second and third groups of the periodic system, which transform into the metal oxides during melting of the raw batch. To the raw batch is added up to 10% of a cerium salt (e. g., $Ce_2O_3$, $CeO_2$, $Ce(NO_3)_4$, $Ce(NO_3)_3$ and a reducing agent, such as $As_2O_3$, red phosphorus, aluminum powder, or cream of tartar.

According to another method, the raw batch consists of one or a mixture of several metaphosphates of the elements of the second and third groups of the periodic system, e. g., $Zn(PO_3)_2$; $Ba(PO_3)_2$; $Al(PO_3)_3$. To this raw batch are added cerium salts and reducing agents as in the first method. Preferred mixing ratios of the three metaphosphates for making my cerium-activated phosphate glasses are given in table.

Table

|  | (1) | (2) | (3) | (4) |
|---|---|---|---|---|
| $Zn(PO_3)_2$ | 50 | 0 | 25 | 15 |
| $Ba(PO_3)_2$ | 0 | 50 | 25 | 45 |
| $Al(PO_3)_3$ | 50 | 50 | 50 | 40 |

Cerium-activated phosphate glasses having similar proportions as those made up from the metaphosphates, but made up of the raw materials according to the first-mentioned method, viz., starting from $P_2O_5$ and either $ZnO$, $BaO$, $Al_2O_3$ or $2Zn(CO_3).3Zn(OH)_2$ or $Ba(CO_3)$ are, of course, equivalent to the preferred glasses according to the table.

I have found that the addition of 2% to 4% cerium to mixture (4) of table, introduced preferably in the form of $Ce_2O_3$ or of $Ce(NO_3)_3.6H_2O$, with further addition of an appropriate amount of any of the above described reducing agents yields a glass with a relatively high conversion of short wave ultraviolet radiation, e. g., 2537 A. into long wave ultraviolet radiation between 3000 and 4000 A.

According to the invention, these new phosphate glasses are used as light filters and for multiple frequency conversion equipment in new combinations with gas and vapor arc lamps in a manner about to be described.

Figure 1:
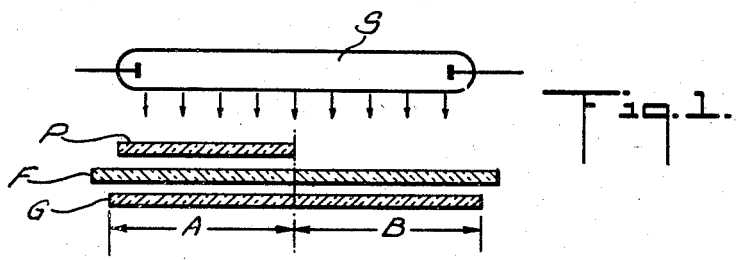
Fig. 1 illustrates an experimental set-up to explain the invention.

Fig. 1 shows in diagrammatic form, an experimental arrangement illustrating the principles of the invention. A plate of any glass (G) capable of emitting visible fluorescence on excitation by long wave ultraviolet radiation (as are most manganese-activated phosphate or silicate glasses) is exposed to the radiation originally produced by an ultraviolet source S, from which the short wave and visible radiation has been filtered out by a Corex black filter F, made of a glass commercially known as "Corning #986," or "red-purple Corex A." Between the light source S which may be of any well-known type, such for example as shown in U. S. Patent No. 2,283,189, and the filter F is placed a glass sheet P consisting of one of the new phosphate glasses according to the invention, and covering about one half of the area of Corex filter F, in the region marked A in the drawing. In the right half, marked B in the drawing, the radiation from light source S passes only the filter F before striking glass plate G, i. e., no phosphate glass is interposed between light source S and filter F.

The striking phenomenon observed with this arrangement is, that the glass plate G remains comparatively dark on the side marked B, while it emits a large amount of visible light on the side marked A, where the phosphate glass P has been interposed between the source S and the filter F. The result is striking and unexpected for any one not familiar with the new fluorescent glass because the expected interpretation of the glass plate P would be that of an additional filter, i. e., of a partly transparent shield which absorbs part of the radiation from light source S. The usual observer would, therefore, expect that the visible fluorescence of glass plate G on the side marked A could only be weaker, or at best, just as good, as on side B.

The explanation of the fact that glass plate G emits more visible radiation on the side where the phosphate glass P has been interposed between the light source S and the filter F is, of course, the property of my new glass to convert the short wave ultraviolet radiation of the light source S into long wave ultraviolet radiation. An added amount of long wave ultraviolet radiation, emitted by glass plate P, passes therefore through filter F, and increases the visible light emission of glass plate G in the region A as compared with that emitted on side B.

Figure 2:
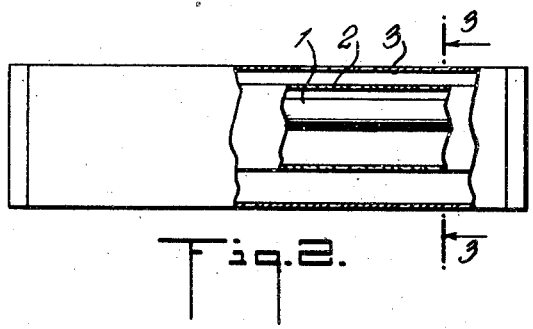
Fig. 2 is a simplified diagram of an ultraviolet lamp and casing according to the invention.
Figure 3:
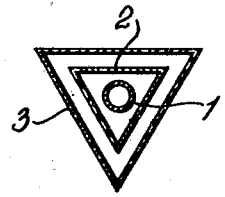
Fig. 3 is a sectional view of Fig. 1 taken along the line 3—3 thereof.

Taking advantage of this phenomenon, I have built two types of lamps. The first type shown in Figs. 2 and 3 consists of a combination of an ordinary "black light" ultraviolet lamp 1, (which consists of a mercury arc lamp built into a fixture having an outer casing or window 3 made of "red-purple Corex A" glass (or "Corning #986") with a second cerium-activated phosphate glass plate or wall 2 interposed between the arc lamp and the "Corex A" glass filter. This new lamp delivers a larger amount of long wave ultraviolet radiation from any given arc lamp than the conventional "black light lamps," and is therefore of higher efficiency in the long wave ultraviolet region than are the commercial lamps of this type. Incidentally, the "Corex A" filter 3 is not as hot during operation, because of the fact that the short wave ultraviolet radiation is not absorbed and transformed into heat, as is the case with the conventional lamps. For a detailed disclosure of a device such as lamp 1, reference may be had to U. S. Patent No 2,383,189.

Figure 4:
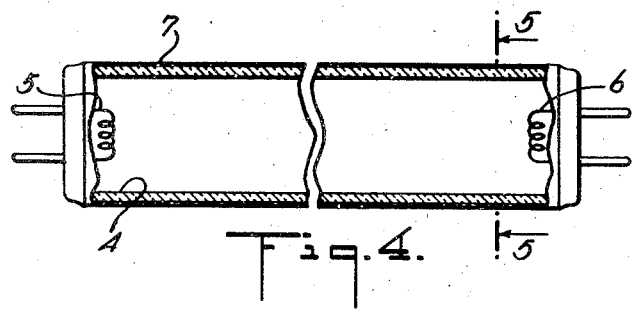
Fig. 4 is a modification showing the invention embodied in a fluorescent lamp.
Figure 5:
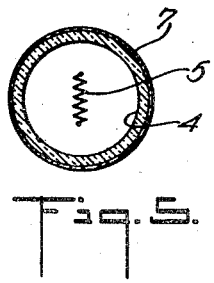
Fig. 5 is a sectional of Fig. 4, taken along the line 5—5 thereof.

A second type of lamp according to the invention, as shown in Figs. 4 and 5, consists of a suitable envelope 4 which contains the usual mixture of gas and vapor filling as customarily employed in commercial fluorescent lamps. Mounted at opposite ends of the envelope, which ends are of course sealed, there are the usual electrodes 5 and 6, either or both of which may be of the thermionic or of the field-emission type. It will be understood of course, that the electrodes 5 and 6 are connected in circuit with any well-known starting control arrangement such as is ordinarily employed in commercial fluorescent lamps. In accordance with the present invention, envelope 4 is made of a cerium-activated phosphate glass as above described. In accordance with the invention also, the exterior surface of envelope 4 is provided with a coating 7 of one of the well-known fluorescent materials which emit visible light more readily in response to long wave ultraviolet radiation than they do to short wave ultraviolet radiation. This coating 7 may for example be of zinc sulfide. For a detailed disclosure of the construction of such a lamp to which the coating can be applied, reference is hereby made to U. S. Patent No. 2,283,189, the disclosure of which is incorporated herein expressly. Since in the type of lamp shown in Figs. 4 and 5, the actual fluorescent coating is applied externally of the envelope 4, it is possible to use for illumination purposes, sulfides such as ZnS; ZnCdS; or CaS. These sulfides could not be used successfully in this particular field in the past, because when they are applied as a coating internally of the envelope 4, they are destroyed by the arc or vapor discharge between the electrodes 5 and 6. It will be understood of course, that the invention is not limited to any particular kind of fluorescent coating 7. If desired, other fluorescent materials which emit visible radiation preferably in response to long wave ultraviolet excitation may be used as an external coating. Examples of such materials are organic fluorescent materials such as the rhodamines, or U-activated $CaF_2$, CaO, or zinc vanadate.

Figure 6:
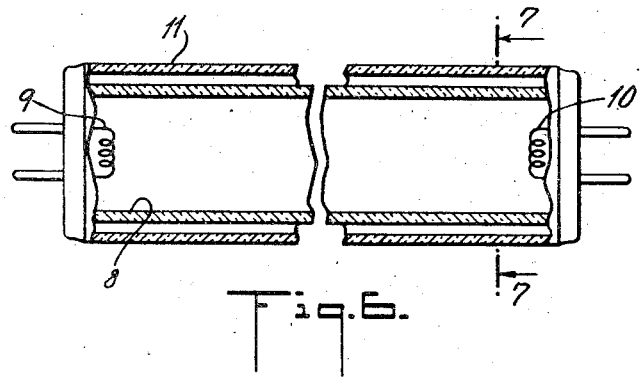
Fig. 6 is a modification of Fig. 4.
Figure 7:
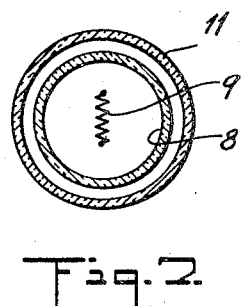
Fig. 7 is a sectional view of Fig. 6, taken along the line 7—7 thereof.

In another embodiment of this type of fluorescent lamp, and as shown in Figs. 6 and 7, the envelope may consist of an internal evacuated and sealed tube 8, carrying at opposite ends the usual electrodes 9 and 10, for sustaining an ultraviolet producing discharge within the cavity of the tube 8 which cavity contains the usual filling of metallic vapor such as mercury vapor and a small percentage of a gas such as argon, helium and the like as described for example in said U. S. Patent No. 2,283,189. Surrounding the tube 8 and in spaced relation thereto, is another glass tube 11. In accordance with the invention, the envelope 8 is composed of one of the above-described cerium-activated phosphate glasses, while the outer casing 11 consists of manganese-activated phosphate glass. When a gaseous discharge is maintained between the electrodes 9 and 10 in the well-known manner, there is emitted both long and short wave ultraviolet radiation. The long wave radiation passes substantially freely through the wall of member 8 and excites the member 11 to visible fluoresence. At the same time, the short wave radiation from the discharge is converted by member 8 to long wave ultraviolet radiation which supplements the excitation of the member 11, thus increasing the overall fluorescent efficiency of the device. The first factor causing this increase of efficiency is the pre-conversion of short wave ultraviolet radiation into long wave ultraviolet radiation by means of the member 8 as described above. The second factor is the lowering of temperature of the visible fluorescent layer which may be either directly in the member 11 or in the form of a fluorescent coating which may be applied to the external or to the internal surface of member 11. This lowering of temperature causes increased efficiency because the short wave ultraviolet radiation is not dissipated as heat but is converted into a long wave ultraviolet radiation. The visible fluorescent sheath carried by member 11 or incorporated in member 11 itself, is a greater distance from the hot discharge path within member 8; and finally the larger external area of the device provides a greater heat radiating surface.

It will be understood of course that the invention is not limited to the particular structures, shapes, or materials herein mentioned, but that various changes and modifications may be made therein without departing from the spirit and scope of the invention.

This application is a division of application Serial No. 517,806, filed January 11, 1944.

What is claimed is:

1. A fluorescent light source comprising, means to generate ultraviolet radiation having long and short ultraviolet wavelength components, means mainly responsive to excitation only by long wave ultraviolet to produce visible fluorescence, and means including a cerium-activated phosphate glass located between said generator means and said responsive means to convert said short wavelength components into long wavelength components whereby visible light is produced in response both to said long wave components and to said short wave components.

2. A fluorescent lamp comprising a sealed envelope containing an ionizable medium for producing ultraviolet radiation including long and short wave length components, the envelope being of a glass which has the property of usefully converting a substantial part of the short wave components into long wave components, and fluorescent means carried by said envelope and responsive to the original long wave components and to said converted components to produce visible fluorescence.

3. A fluorescent lamp according to claim 2 in which the glass of the envelope is of the cerium-activated phosphate type.

4. A fluorescent lamp according to claim 2 in which said fluorescent means is in the form of a stratum on the exterior of said envelope.

5. A fluorescent lamp comprising a pair of spaced glass casings, one of which has means to support on its interior a discharge for producing ultraviolet radiations containing long and short wave lengths and being of a glass which has the property of usefully converting short ultraviolet wave lengths into long ultraviolet wave lengths, and fluorescent means responsive to said long ultraviolet wave lengths and to said converted wave lengths and carried by the other of said casings.

6. A fluorescent lamp according to claim 5 in which the casings surround each other, the inner casing being of cerium-activated phosphate glass, and the outer glass casing being of manganese-activated fluorescent glass.

7. A fluorescent lamp comprising an enclosing glass envelope having means to produce an electric discharge therein, which discharge produces long wave length ultra-violet and a substantial portion of short wave length ultra-violet, a signal fluorescent coating on the wall of said envelope and responsive substantially entirely to long wave length ultra-violet, and means incorporated in said glass for converting the short wave length ultra-violet from said discharge into long wave length ultra-violet before acting on said fluorescent coating.

LAWRENCE R. BICKFORD, Jr.